United States Patent
Krishnaswamy et al.

(10) Patent No.: US 11,039,391 B2
(45) Date of Patent: Jun. 15, 2021

(54) WIRELESS SYSTEM USING SLEEP-STATE MODULATION

(71) Applicant: Wisconsin Alumni Research Foundation, Madison, WI (US)

(72) Inventors: Bhuvana Krishnaswamy, Madison, WI (US); Yaman Sangar, Madison, WI (US)

(73) Assignee: Wisonsin Alumni Research Foundation, Madison, WI (US)

( * ) Notice: Subject to any disclaimer, the term of this patent is extended or adjusted under 35 U.S.C. 154(b) by 0 days.

(21) Appl. No.: 16/456,299

(22) Filed: Jun. 28, 2019

(65) Prior Publication Data

US 2020/0413338 A1  Dec. 31, 2020

(51) Int. Cl.
*H04W 52/02* (2009.01)

(52) U.S. Cl.
CPC .............. *H04W 52/0229* (2013.01)

(58) Field of Classification Search
CPC ......... H04W 52/0258; H04W 52/0274; H04W 52/028; H04W 52/0287; H04W 52/029; H04L 25/03343; H04L 2027/0095; H04L 27/2623; H04L 27/2624
See application file for complete search history.

(56) References Cited

U.S. PATENT DOCUMENTS

| 2008/0084304 | A1 | 4/2008 | Yarvis |
| 2010/0257424 | A1 | 10/2010 | Lau et al. |
| 2010/0279745 | A1 | 11/2010 | Westcott et al. |
| 2014/0146723 | A1* | 5/2014 | Chang ............... H04W 52/0206 370/311 |
| 2016/0127995 | A1 | 5/2016 | Merlin et al. |
| 2016/0191148 | A1* | 6/2016 | Harrington ........ H04B 7/18517 370/316 |

OTHER PUBLICATIONS

Dezhi Feng et al.; "Pulse Position Coded PDUs: A New Approach to Networking Energy Economy" 2017 14th IEEE Annual Consmer Communications & Networking Conference (CNNC), Jul. 20, 2017; pp. 1-4; Michigan; US.
International Search Report for PCT/US2020/036768 dated Oct. 30, 2020.
Semtech Corporation; "Wireless, Sensing & Timing Products"; LoRa Modulation Basics AN1200.22; www.semtech.com; Revision 2, May 2015—(26) pages.
Shiu et al., "Different Pulse-Position Modulation for Power-Efficient Optical Communication"; IEEE Transactions on Communications, vol. 47, No. 8, pp. 1201-1210; Aug. 1999—(10) pages.
Zhu et al., "Communication through Silence in Wireless Sensor Networks"; Georgia Institute of Technology, Atlanta, GA—(8) pages, Aug. 2005.

* cited by examiner

*Primary Examiner* — Pao Sinkantarakorn
(74) *Attorney, Agent, or Firm* — Boyle Fredrickson, S.C.

(57) ABSTRACT

A low-power transmission system for periodically transmitted data communicates the periodic data as an interval between two transmitted anchor symbols when the transmitter and associated circuitry are shut down. Meaningful power savings for short data words is obtained by use of a star topology allowing elimination of the receiver power consumption. Multi-bit anchor symbols provide improved error detection and the separation of simultaneous transmission from multiple transmitters by a single receiver.

19 Claims, 5 Drawing Sheets

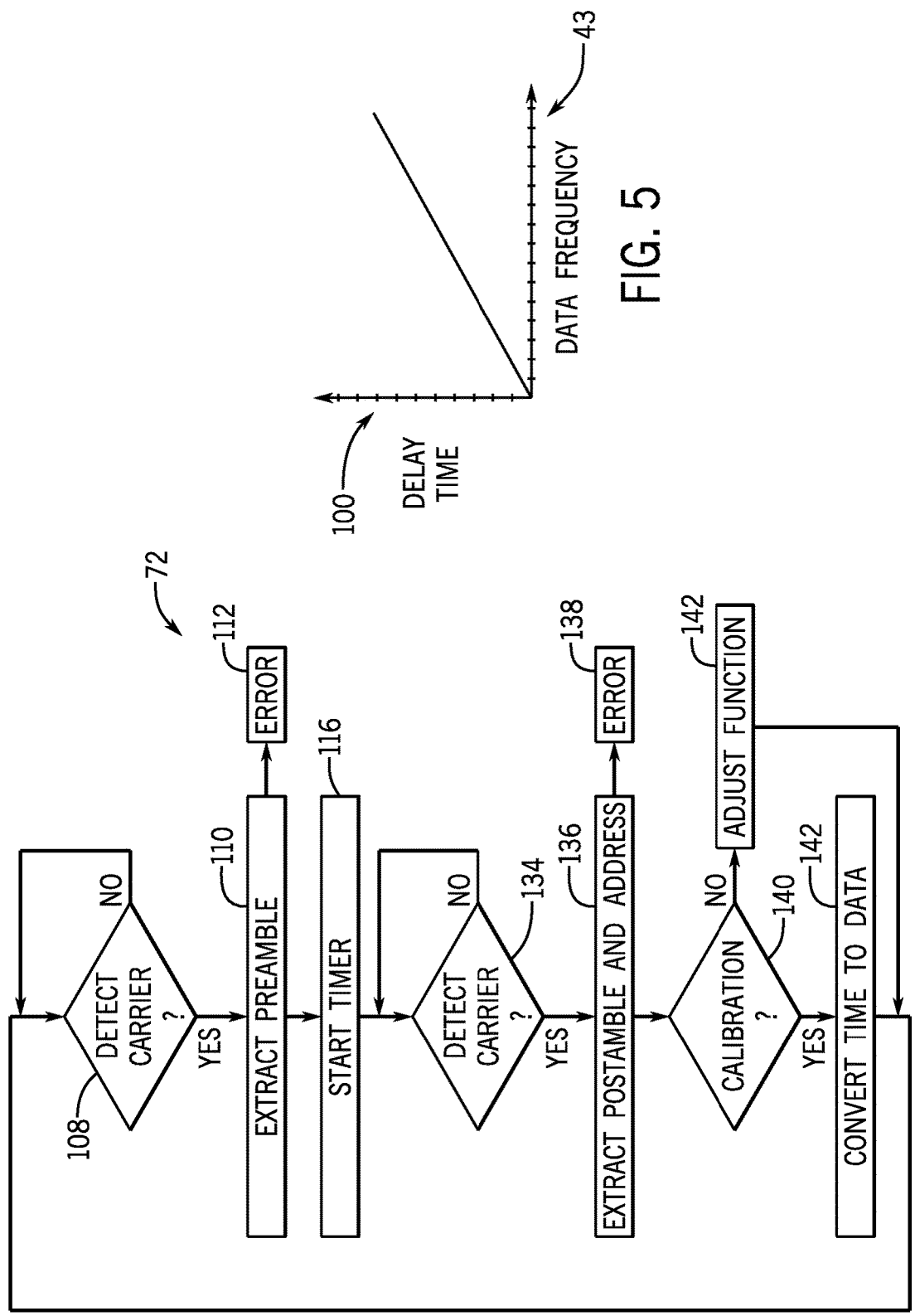

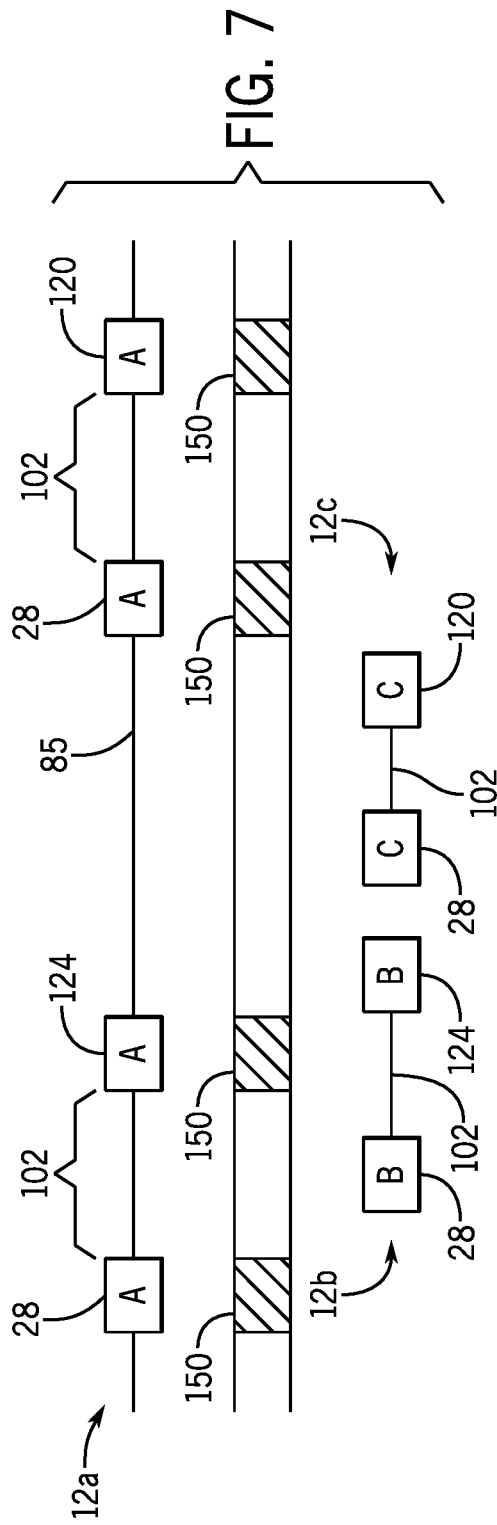
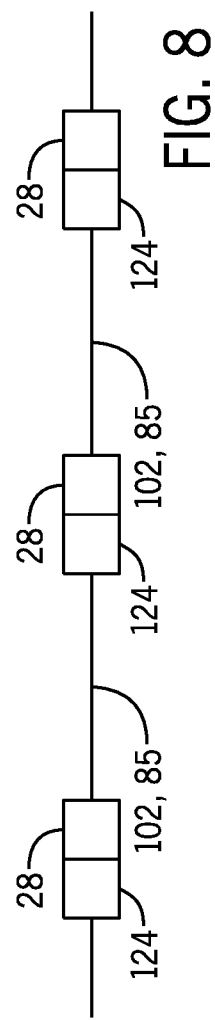
FIG. 8
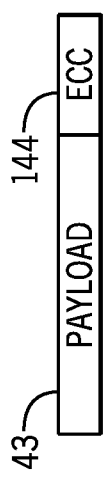
FIG. 9

WIRELESS SYSTEM USING SLEEP-STATE MODULATION

STATEMENT REGARDING FEDERALLY SPONSORED RESEARCH OR DEVELOPMENT

CROSS REFERENCE TO RELATED APPLICATION BACKGROUND OF THE INVENTION

The present invention relates generally to radio transmitters and receivers, and in particular, to a low powered data transmitting system suitable for battery-powered remote sensors.

Real time data monitoring using wireless sensors can be useful in a wide range of applications including, for example, "smart agriculture" where such sensors can make measurements of soil moisture or provide livestock monitoring, medicine where wearable sensors can monitor the vital signs of ambulatory patients, as well as a range of other similar mobile and stationary applications.

Desirably these wireless sensors provide long communication range (to provide flexibility in remote-sensing) and low power consumption (to accommodate battery power and long life).

The trade-off between long communication range and low power consumption is often managed by placing the transmitter into a low-power mode at times between the transmission of sensor readings. In such low-power modes, the transmitter and sensor inputs may be deactivated and the receiver operated in a reduced power configuration to monitor for incoming messages. When data needs to be collected, the transmitter wakes up, and a sensor reading may be taken and transmitted and then the transmitter placed again in low-power mode until the next transmission time. This approach essentially trades off transmission power and data rate, that is, reducing average transmission power but also decreasing the transmission time and hence the amount of communicated data.

An intriguing possibility for further reducing transmission power is to send data not by transmitting radio signals holding that data but instead by sending two anchor symbols (a start and stop symbol) and turning the transmitter off in between these transmissions. The data is then derived from the length of the transmitter "off" time. A discussion of this possibility is provided in the paper by Zhu and Sivakumar entitled "Challenges: Communication through Silence in Wireless Sensor Networks," published in 2005 and hereby incorporated by reference.

This "no-power" transmission technique has not been widely adopted, if at all. Possibly, this is because significant energy savings are obtained only for long data words and yet the technique is fundamentally limited with respect to data word length, a limitation that arises because the amount of time necessary for the data transmission is exponentially related to data word length. Consider, for example, a 20-bit data word normally transmitted in 20 clock cycles. Transmitting this data word by measuring a time duration between two anchor symbols would require over a million clock cycles.

Attempts to boost the energy savings of a transmitter employing no-power transmission has led researchers to explore sophisticated techniques such as single bit anchor symbols which can be transmitted with low-power and baseband radio transmitters eliminating carrier synchronization time, but these approaches are difficult to implement with existing hardware or have substantial range limitations.

SUMMARY OF THE INVENTION

The present inventors have recognized that an important class of data monitoring applications can be implemented in a star topology eliminating the need for radio receiver circuitry. By eliminating the power consumption of such circuitry and employing a "deep" sleep during no-power transmission for both the transmitter and transmitter processor, the invention can provide as much as three times the energy savings over comparable low-power transmission techniques. Importantly, the savings can be achieved using standard carrier modulation transmission and multi-bit anchor data, the former providing substantial range and the latter permitting robust addressing and collision avoidance in a multisensor environment.

Specifically then, in one embodiment, the present invention provides a wireless data transmitter including a radio transmitter providing modulation of a radiofrequency carrier according to a data pattern in a wake state, and cutting transmission of the radiofrequency carrier in a sleep state, the latter providing less power consumption than the wake state. A controller communicates with the radio transmitter and receives data to be transmitted, the controller executing a program stored in non-transitory medium to: (a) switch the radio transmitter into the wake state for transmission of a multi-bit preamble through the modulation of the carrier; (b) after transmission of the preamble, switch the radio transmitter into the sleep state for a data duration according to a function mapping the data duration to a unique value of the data to be transmitted; (c) switch the radio transmitter into the wake state for transmission of a multi-bit postamble through modulation of the carrier to signal an end of the data duration; and (d) repeating steps (a)-(d).

It is thus a feature of at least one embodiment of the invention to exploit the benefits of no-power data transmission using versatile carrier modulation and multi-bit anchor symbols.

The controller may repeat steps (a)-(d) with different data transmission without radio reception.

It is thus a feature of at least one embodiment of the invention to eliminate the overhead of receiver circuitry to boost the impact of no-power data transmission.

The controller may operate in a wake state during steps (a) and (c) and switch itself to a sleep state during step (b).

It is thus a feature of at least one embodiment of the invention to profoundly decrease energy consumption during transmission by turning off not only the transmitter but the controller itself and relying on sleep state timers.

The consumption during step (b) by the wireless data transmitter is more than 1000 times less than the power consumption during steps (a) and (c).

It is thus a feature of at least one embodiment of the invention to substantially decrease energy consumption during an interval of no-power transmission to boost the practicality of this technique.

The transmitted preamble and postamble may communicate data, uniquely identifying them to the data to be transmitted at step (b).

It is thus a feature of at least one embodiment of the invention to link the preambles and postambles to permit interleaving of different messages without interference, taking advantage of the sparsity of actual data transmission that reduces collisions.

The preamble and postamble may remain constant in each repetition of step (d).

It is thus a feature of at least one embodiment of the invention to remove data communication burdens from the preamble and postamble to minimize their length and energy consumption.

At least one of the preamble and one of the postamble may be adapted to provide an encoded address uniquely identifying the wireless data transmitter with respect to other wireless data transmitters.

It is thus a feature of at least one embodiment of the invention to provide robust addressing to permit transmission from multiple transmitters associated with different sensors.

The wireless transmitter may further include an analog-to-digital converter and operate to read a sensor attached to the analog-to-digital converter before step (c) to provide the data to be transmitted. The repetition of step (d) may be greater than 100 times a mode of the data duration.

It is thus a feature of at least one embodiment of the invention to exploit the high latency tolerance of sensor data such as soil moisture data to provide extremely low-powered data communication.

The data may have a predetermined frequency distribution describing how common given values of the data are, and the most frequent data values may be mapped to smallest data durations by the function.

It is thus a feature of at least one embodiment of the invention to minimize transmission duration, potentially increasing the amount of data that can be transmitted in a given interval.

The controller may further delay after step (d) and before step (a) by a pseudorandom or random interval.

It is thus a feature of at least one embodiment of the invention to minimize collisions between different transmitters by randomizing the repetition rate thereby improving use of the system in multisensor applications in the context of a star network.

The data to be transmitted may include error correction data and payload data, the error correction data operating to allow error detection or correction in the payload data.

It is thus a feature of at least one embodiment of the invention to relax synchronization requirements and maximize range transmission for a given power through the use of error correction techniques built into the data transmitted by silence.

The controller may periodically use predetermined calibration data as the data to be transmitted, the calibration data providing an indication of the speed of a clock of the controller controlling the data duration in step (b).

It is thus a feature of at least one embodiment of the invention to eliminate the need for clock synchronization information in the preamble and postamble while accommodating clock drift.

The modulation rate of the preamble and postamble may be different from a clock rate of a timer measuring the data duration.

It is thus a feature of at least one embodiment of the invention to allow sizing of the clock rate, for example, at less than bandwidth-induced limits of the communication channel to relax synchronization and offset requirements between the transmitter and receiver.

The preamble and postamble may be narrowband signals wherein a frequency of the carrier is at least 5000 times a bandwidth of the preamble and postamble.

It is thus a feature of at least one embodiment of the invention to eliminate the need for wide bandwidth communications and reception, simplifying and reducing power consumption for a given range of data transmission.

The wireless data transmitter may further provide a radio receiver providing demodulation of the radiofrequency carrier of the radio transmitter as received wirelessly and a receiver controller communicating with the radio receiver to: (a) detect transmission of the preamble by the radio transmitter; (b) start a timer based on detection of the preamble; (c) detect transmission of the postamble by the radio transmitter to stop the timer and provide the data duration; (d) decode a transmitter address from at least one of the preamble and postamble; and (d) use the function on the data duration to decode the data to be transmitted and associated with the decoded address.

It is thus a feature of at least one embodiment of the invention to provide a system that can be implemented with star topology having many transmitters communicating with a central receiver and distinguished by preamble-based addressing.

The radio receiver may further provide a signal strength measurement of the radiofrequency carrier, and the receiver controller may detect a transmission error if the signal strength measurement fails to drop by a predetermined amount after detection of the preamble or postamble.

It is thus a feature of at least one embodiment of the invention to provide improved error detection by monitoring carrier signal strength.

In addition or alternatively, the controller may reject decoded data if a postamble associated with the decoded data is not followed by a matching preamble.

It is thus a feature of at least one embodiment of the invention to use linked preambles and postambles to detect loss of an anchor signal associated with a data error.

These particular objects and advantages may apply to only some embodiments failing within the claims and thus do not define the scope of the invention.

BRIEF DESCRIPTION OF THE DRAWINGS

FIG. 4 is a flowchart similar to that of FIG. 3 showing the steps executed by the receiver of FIGS. 1 and 2;

FIG. 5 is a chart showing a mapping of data word frequency to delay times for improved transmission throughput;

FIG. 7 is a chart showing collision avoidance during multiple simultaneous transmissions from different transmitters;

FIG. 8 is a figure similar to FIG. 7 showing combined preamble and postamble transmissions; and FIG. 9 is a diagram of decoded data showing a payload and error correction portion.

DETAILED DESCRIPTION OF THE PREFERRED EMBODIMENT

Figure 1:
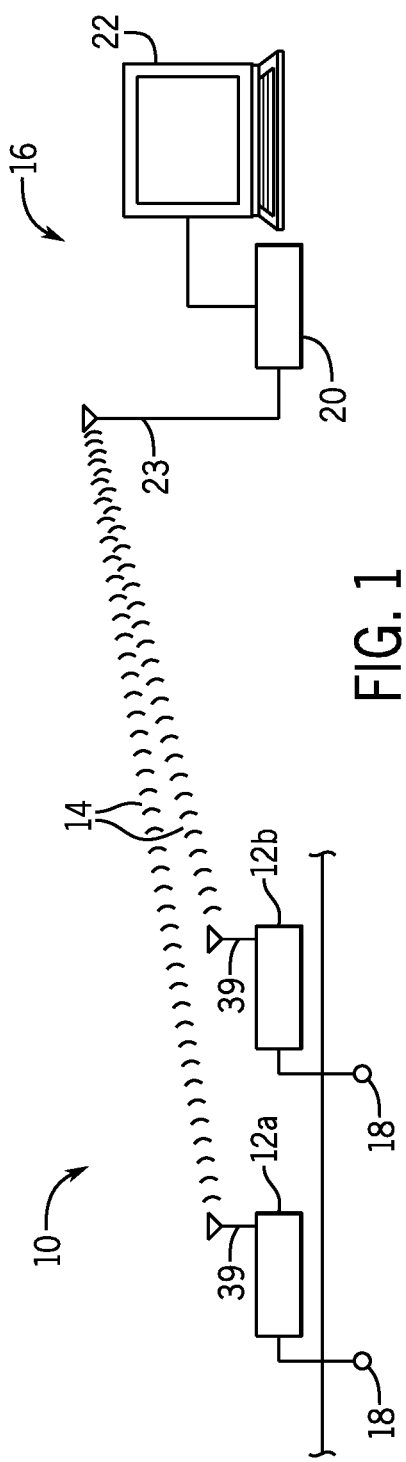
FIG. 1 is a block diagram of a star topology network employing the transmitter system of the present invention providing multiple transmitters communicating with a central receiver.

Referring now to FIG. 1, a wireless data transmitter 10 may provide for multiple transmitter units 12a and 12b (only two shown for clarity) communicating by radio signals 14 with a common receiver 16 in a so-called "star" topology in which there is one way communication from each transmitter unit 12 to the common receiver 16. In one application, each of the transmitter units 12 may be associated with one or more sensors 18, for example, soil moisture sensors, to read data from those sensors 18 and transmit data collected by the sensors 18 to the common receiver 16. This sensor data 43 may be received by a receiver unit 20 of the common receiver unit 20 and communicated to a terminal 22, for example, for display and further processing of the sensor data.

Figure 2:
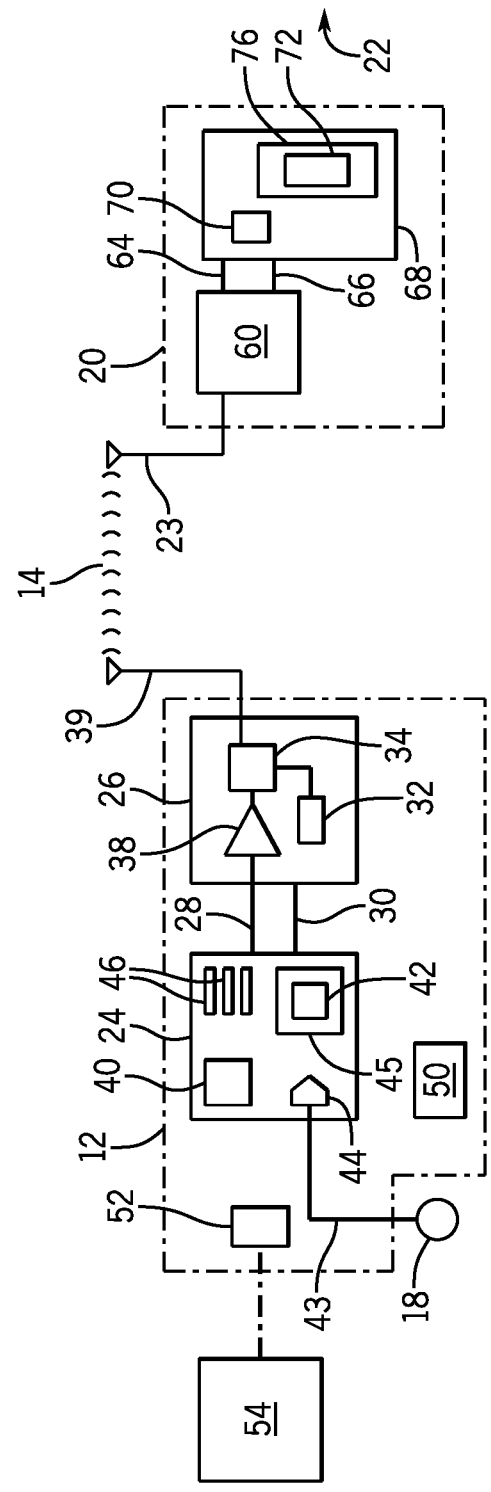
FIG. 2 is a block diagram of the principal components of the transmitter and receiver of FIG. 1.

Referring now to FIG. 2, each transmitter unit 12 may provide for a transmitter controller 24 and a transmitter 26. The transmitter 26 may receive data for a preamble 28 or postamble 124 (to be discussed below) from the transmitter controller 24 and a power state signal 30 controlling operating power of the transmitter 26. The power state signal 30 may define an active or "wake" state during which radio transmission can occur and during which the transmitter unit 12 may consume in excess of 10 mA and more typically in excess of 40 mA. Alternatively, the power state signal 30 may define a "sleep" state in which the transmitter is shut down so that the transmitter unit 12 consumes less than 1000 nano amps and in some cases less than 200 nano amps. During the sleep state, no transmission of data occurs.

The transmitter 26 may provide standard carrier-modulating transmitter circuitry, for example, providing a frequency shift keying as will be discussed below. Transmitters 26 suitable for use with the present invention include but are not limited to the Linx-NT transceiver module commercially available from Linx Technologies of Merlin, Oreg., USA, the CC1101 high-performance RF transceiver commercially available from Texas Instruments of Dallas, Tex., USA, or the nRF24L01 single-chip 2.4 GHz transceiver commercially available from Nordic semiconductors of Trondheim, Norway. Although these circuits include receiver circuitry, during use with the present invention, the receiver circuitry will be deactivated or placed in sleep mode during the majority or all of the operating time of the wireless status transmitter 10. It will be understood that such receiver circuitry is not required.

Transmitter 26 will include a carrier signal generator 32 providing a radiofrequency carrier signal to a modulator/RF amplifier 34 which receives a baseband signal from an amplifier 38 in turn receiving data of the preamble 28 or postamble 124. The modulator/RF amplifier 34 transmits the carrier signal from the carrier signal generator 32 modulated by the baseband signal and transmits this modulated carrier signal on antenna 39. The power state signal 30 communicates with these various components to switch them on or off to control power consumption.

The transmitter controller 24 may be a standard microcontroller, for example, such as the MSP430FR2355 or MSP430FR599x commercially available from Texas instruments or the STM32L commercially available from ST Microelectronics of Shanghai, China. Generally, the transmitter controller 24 will include a processor 40, for example, a von Neumann type microprocessor executing a program 42 stored in computer memory 45 as will be discussed below. The transmitter controller 24 may also include standard input and output circuits, for example, an A/D converter 44 which may be connected to the sensor 18 to obtain data therefrom which will be provided as sensor data 43. The sensor data 43 may be expressed as one or more binary words, for example, having a total length of 2-16 bits as will be discussed below.

The transmitter controller 24 may also include set of timers 46 that may operate independently of execution of the program 42 by the processor 40 to communicate with the processor 40, for example, through an interrupt circuitry of a type well known in the art.

The transmitter controller 24, like the transmitter 26, may also operate in a variety of power modes including a wake mode (active) and a sleep mode. In the latter sleep mode, the timers 46 may continue to operate counting an associated clock, while other major systems of the transmitter controller 24 including the processor 40 and A/D converter 44 are shut down to reduce power. When an activated timer 46 reaches a preprogrammed count value, it may wake the processor 40 moving it out of the sleep state to resume execution of the program 42 as generally understood in the art.

Example power consumption for suitable circuits in the wake (active) and sleep states are shown below in Table I. It should be emphasized, however, that the invention is not limited to the use of these particular circuits which are shown only by way of enabling example.

TABLE I

| | | Active Current (mA) | Active Current (mA) | Idle Current (mA) | Sleep Current (nA) |
|---|---|---|---|---|---|
| Transmitter controller 24 | MSP430FR2355 | 1 | | 0.7 | 1300 |
| | MSP430FR599x | 0.1 | | 0.5 | 45 |
| | STM32L | 0.45 | | 0.3 | 140 |
| Transmitter 26 | Linx-NT | 42.5 | 42.5 | | 1 |
| | CC1101 | 27.4 | 27.4 | | 200 |
| | nRF24L01 | 11.3 | 0.026 | | 900 |
| Receiver (not used) | Linx-NT | 22.5 | 22.5 | | 1 |
| | CC1101 | 15.4 | 15.4 | | 200 |
| | nRF24L01 | 8.9 | 0.026 | | 900 |

The transmitter unit 12 may further provide for a battery 50 for powering the transmitter unit 12 and may optionally provide a programming port 52, for example, being a mechanical electrical connector or low energy radio receiver, for example, an RFID circuit or the like for receiving programming data from a programming device 54. Such programming data may be used to assign an address to the transmitter unit 12 or to change any of the transmission parameters (length of preamble 28 or postamble 124, conversion functions, error corrections, etc.) described below.

Referring still to FIG. 2, the receiver unit 20 may be any receiver compatible with the transmitter 26 having a receiver 60 of the type generally known in the art communicating with antenna 62 to receive transmissions from the transmitter unit 12 and to provide demodulated data 64 and a received signal (carrier) strength signal 66 to a receiver controller 68. The receiver controller 68 may be a general-purpose microprocessor that can communicate with the terminal 22 including a processor 70 executing a program 72 stored in computer memory 76.

Figure 3:
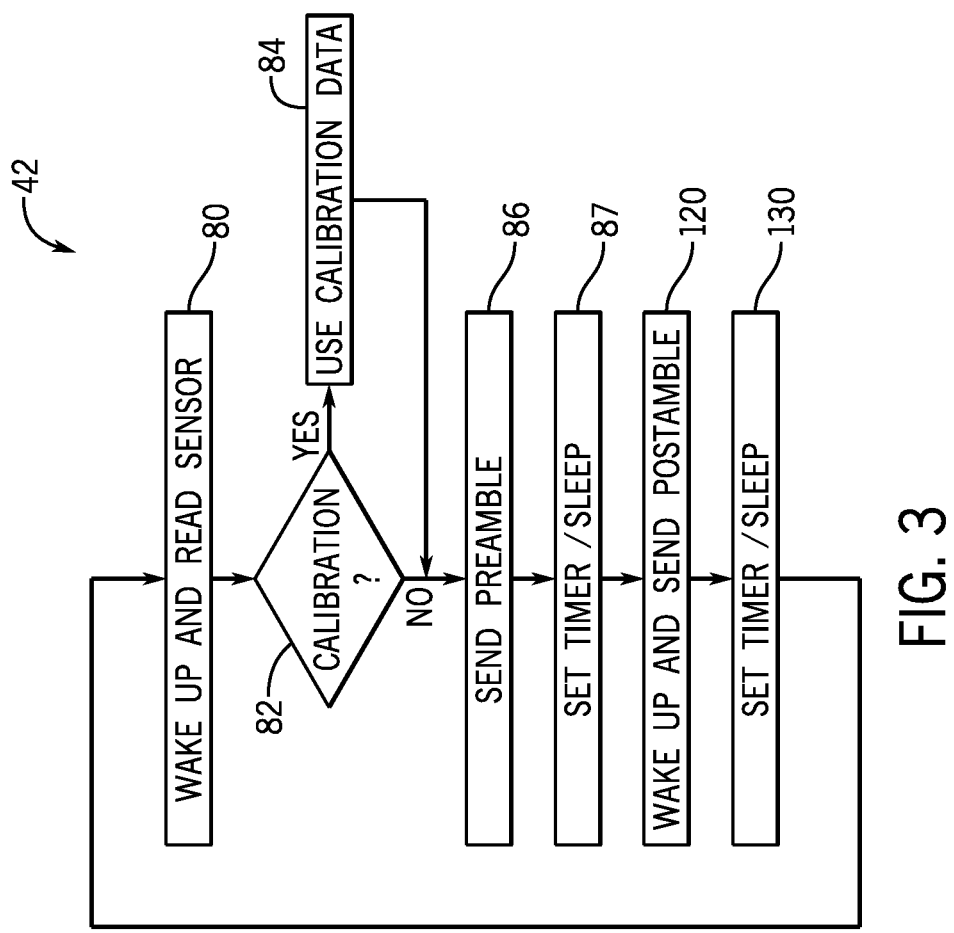
FIG. 3 is a flowchart showing the steps executed by the transmitter controller of the transmitter of FIGS. 1 and 2.
Figure 6:
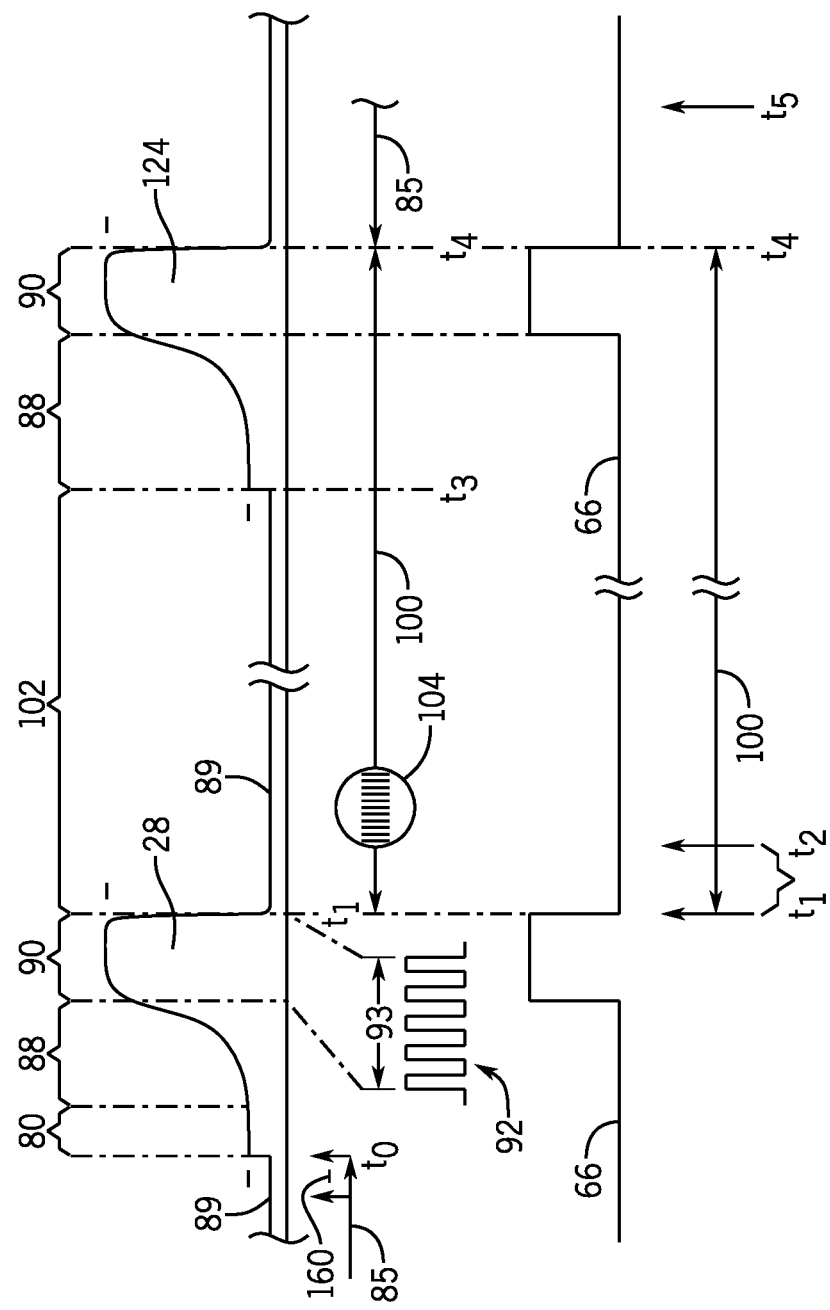
FIG. 6 is a timing diagram showing the operation of the transmitter and receivers of FIG. 2 during a normal transmission cycle.

Referring now to FIGS. 3 and 6, during operation of the wireless data transmitter 10, the processor 40 will be awakened by the expiration of a first timer 46 (set at a previous cycle) at time instant $t_o$. Upon awakening, the processor 40 jumps to a predetermined interrupt vector of the program 42 to read the sensor 18 through the A/D converter 44 as indicated by process block 80.

Prior to this time to, the transmitter controller 24 and transmitter 26 were in the sleep state during an inter-sampling duration 85 having a sleep state current consumption 89, for example, being on the order of microamps and desirably less than 10 µA. After awaking of the transmitter controller 24 at instant $t_0$, the current consumption of the wireless data transmitter 10 may rise to a pre-transmission level, for example, being greater than 1 µA and less than 2 mA during a ramp-up interval 88, The time required to wake up the transmitter controller 24 and acquire the sensor data may be a few microseconds, for example, less than 50 µs.

The first timer 46 is normally set to a length of time matching a desired inter-sampling duration 85 between readings of the sensor 18 which may, for example, be on the order of many minutes or hours.

After the data from the sensor 18 has been acquired, at decision block 82, the processor 40 determines whether a calibration of the wireless data transmitter 10 is required and if so, the data read from the sensor 18 is swapped with calibration data per process block 84. Generally, the calibration data provides a predefined data value that can be used by the receiver 16 to calibrate its clock for timing as will be discussed below. This calibration process is performed infrequently as determined by the stability of the internal clock of the transmitter controller 24 controlling the timers 46 and a corresponding clock circuit in the receiver unit 20. For example, the calibration process may occur on a daily basis in contrast to an inter-sampling duration 85 of an hour or less. The calibration process may be triggered by a timer 46 or by counting occurrences of the sampling of sensor 18.

Typically, at decision block 82 calibration will not be required and the data obtained from the sensor 18 will be the data transmitted.

In either case, the program 42 next proceeds to process block 86 and the transmitter controller 24 begins a ramp-up at interval 88 during which current consumption rises, for example, to a value between 2 µA and 5 µA for a duration of between 2 ms and 10 ms being in energy and time required for the transmitter 26 to be prepared for transmission. Generally, the interval 88 is selected to be slightly longer than the longest expected time duration necessary for ramp-up. After this transmitter ramp-up time of interval 88, transmission of the preamble 28 occurs during interval 90. In one example, this interval 90 may last 3.9 ms or less for the transmission of a 16-bit preamble 28 at a modulation frequency of 96 kHz. The preamble 28 may be expressed as a set of binary pulses 92 having values of one or zero and a word size 93 ranging between 2-18 bits, in one embodiment, the preamble 28 may encode an address of the transmitter controller 24 as previously programmed by the programming device 54 discussed above. In addition, the preamble 94 may uniquely identify itself as a preamble 28 rather than a postamble 124 as will be discussed below and may uniquely link itself to a postamble 124 possibly through a common address.

In one embodiment, the transmitter 26 may transmit the preamble 94 (and later the postamble 124) using a narrowband modulation, for example, a two-frequency, frequency shift keying operating on a carrier frequency of approximately 902-928 MHz and having a modulated bandwidth of approximately 100 kHz. Narrowband transmission allows the wireless data transmitter 10 to have a long range with reduced power; however, the invention also contemplates possible wideband transmission if faster data communication is required.

At the conclusion of the transmission of the preamble, a timer 46 is set for a time that encodes the sensor data 43 to be transmitted according to an encoding function which encodes the sensor data 43 into a time duration. A simple encoding system simply takes a time duration that is less than or equal to $2^N$ where N is the sensor data 43. However, in an alternative embodiment, and referring to FIG. 5, values of the sensor data 43 may be ranked according to their anticipated transmission frequency (derived either through empirical measurements or during a dynamic profiling process). The values of the sensor data 43 as so ranked are then mapped to delay times 100, so that more frequent values of sensor data 43 map to shorter delay times 100, nevertheless preserving a one-to-one mapping between data values of sensor data 43 and delay times 100. The effect of this mapping is to reduce the average delay time 100 during use of the wireless data transmitter 10 and thus increase the transmission frequency reducing errors caused by clock drift and the like.

Returning again to FIGS. 3 and 6, once the timer 46 is set, the transmitter controller 24, through program 42, sets itself and the transmitter 26 to a sleep state at time $t_1$ (the transmitter controller 24 to be awakened by the timer 46 in the future) as indicated by process block 87. The interval 102 placed in the timer 46 is equal to the delay time 100 minus a ramp-up interval 88 and the transmission interval 90 for the transmitter 26.

With the transmitter controller 24 and the transmitter 26 in sleep mode, transmission interval 102 passes with extremely low power consumption, for example, with a current draw of less than 2 µA comparable to the power consumption during inter-sampling duration 85. This clock signal 104 controlling the interval 102 (in the delay time 100) by incrementing the timer 46 is typically much faster than the modulation frequency of the preamble 28 which may be 9.6 kHz while the clock signal 104 may operate at 32 kHz. Normally the clock signal 104 frequency is also much less than the maximum bandwidth of the communication channel defined by the frequency of the carrier signal and may be varied as desired to reduce errors caused by the offset between comparable clocks of the transmitter unit 12 and the receiver 16 used to measure this delay time 100.

Referring now also to FIG. 4, a program 72 executing on the receiver unit 20 during this transmission by the transmitter 26 may monitor antenna 23 to detect the carrier signal from the transmitter 26 during (and slightly before) the interval 90 as provided by the received signal strength signal 66. When the carrier signal is detected as indicated by decision block 108, the receiver unit 20 may collect data of the preamble 28 per process block 110 by demodulating the carrier signal. This demodulation, for example, can employ a correlation process to detect the pulses 92 without the need for earlier synchronization of the demodulator with the transmitter 26. The correlation process nevertheless may be informed by a known modulation frequency and expected word length of the preamble 28. These values (and any other necessary values that need to be shared between the transmitting units 12 and the receiving units 20) may be preprogrammed into the components of the wireless data transmitter 10 or communicated in a commissioning process occurring before the transmissions that are now being described.

The demodulation of process block 110 extracts not only the data of the preamble indicating an address but also captures a time of the last bit of the preamble 28 which establishes time $t_1$.

In the demodulation process, the receiver unit 20 also determines whether the previously decoded bit sequence was a postamble 124 and if not throws an error per process block 112 discarding the current timer value timing delay time 100 based on an indication that there was a lost postamble 124 and hence the data has been corrupted.

Once the established time $t_1$ is determined, a timer in the processor 70 is started, for example, at time t2 and the interval between this time $t_2$ and the established time $t_1$ (for example, from time stamped data before the correlation) indicating arrival of the last symbol of the preamble 94 is added to this timer to begin a measurement of the time delay time 100 as indicated by process block 116.

Referring again to FIGS. 3 and 6, at time $t_3$ the timer 46 on the transmitter unit 12 measuring the interval 102 again wakes the transmitter controller 24 and transmitter 26 moving them to the wake state as indicated by process block 120. Transmitter controller 24 initiates the ramp-up interval 88 and causes transmitter 26 to begin transmission of a postamble 124 over interval 90 timed to be complete at the end of delay time 100.

The postamble 124 may be similar to the preamble 28 with respect to carrier frequency and modulation frequency but may be different in terms of data conveyed by the modulated bits to the extent that the postamble 124 identifies itself as a postamble 124 (rather than a preamble 28) allowing detection of lost anchor transmissions as discussed briefly above with respect to process block 112. The postamble 124 may link itself to the preamble 28, for example, by encoding a common address of the transmitter unit 12 or by other linking data.

Upon completion of the transmission of the postamble 124 per process block 120 the transmitter controller 24 and transmitter 26 return to a sleep state per process block 130 at time $t_4$ after setting a timer 46 for the inter-sampling duration 85. The process blocks 84, 82, 86, 87, 120, and 130 may then be repeated after the inter-sampling duration 85. Because the preamble 94 and postamble 124 do not contain the sensor data 43 to be transmitted which is instead conveyed by the sleep interval 102, the preamble 94 and postamble 124 generally remain constant during this repetition process.

Referring again to FIGS. 4 and 6, the receiver unit 20, slightly before transmission of the postamble 124, may again detect the carrier as indicated by decision block 134 using received signal strength 66 and may begin a demodulation process indicated by process block 136 and similar to that described with respect to process block 110. Again, if the demodulation indicates that a preamble 28 has been received when a postamble 124 is expected, it can be assumed that there was a loss of an anchor symbol and an error is thrown as indicated by process block 138 causing a resetting and discarding of the value of the timer timing the delay time 100.

Otherwise, the conclusion of the preamble is detected, for example, at time $t_5$ fixed to earlier time stamped data at time $t_4$, and with the necessary subtraction, the delay time 100 is determined and decoded using the inverse of the function described with respect to FIG. 5.

At succeeding process block 140, if the data is calibration data (for example, determined by special preamble 94 or postamble 124 or a particular value of the data being transmitted by delay time 100, the decoded data is compared to a predefined calibration value and used to make an adjustment in the clock of the receiver unit 20 per process block 142. This adjustment process may simply provide a factor adjustment to the function of FIG. 5 without changing actual clock speeds or may adjust the clock speed.

At process block 142 the decoded data may be corrected according to error detection techniques and then output, for example, to the terminal 22 shown in FIG. 1. In this regard, and referring momentarily to FIG. 9, it will be understood that the sensor data 43 may be concatenated to error correction codes 144 during the transmission process by the transmitter controller 24 according to well-known error correction techniques allowing for the detection and correction of bit errors in the received data. The error correction codes, for example, may use cyclic redundancy coding or other techniques known in the art.

Any error correction codes may be augmented by an error reduction technique operating by reducing the speed of the clock signal 104 shown in FIG. 6 which essentially increases the timing (hamming) distance between adjacent values of the sensor data 43.

Referring now to FIG. 7, it will be appreciated that when there are multiple transmitting units 12, a transmission by the transmitter unit 12*a* may potentially collide with simultaneous transmissions from other transmitter units 12*b* or 12*c*. Nevertheless, because the sensor data 43 is conveyed at a time when there is no transmission (interval 102), collisions of interfering transmissions can only occur during the relatively short time of transmission of the preambles 28 or postambles 124 indicated by intervals 150 and not during the intervals 102 or the inter-sampling duration 85. For this reason, transmissions by other transmitter units 12*b* and 12*c* can occur at overlapping times with the transmissions by transmission unit 12*a* so long as the various preambles 28 and postambles 124 (indicated by the letters A, B, and C) do not overlap.

Occasional collisions can be addressed simply by detecting the collision (through error detection or lost anchor symbol detection) and discarding that data to wait for a next data transmission, possible by sending the data at a higher rate than is required and are workable because of the statistical unlikelihood of a collision based on the sparsity of actual transmission shown in FIG. 7.

In order to prevent repeated collisions caused by alignment of inter-sampling durations 85 (shown in FIG. 6) between multiple transmitter units 12, the length of the inter-sampling duration 85 may be perturbed by a random amount 160.

Referring now to FIG. 8, although the invention contemplates that an inter-sampling duration 85 may separate a postamble 124 and succeeding preamble 28 while a distinct transmission interval 102 may separate a preamble 28 and succeeding postamble 124, it will be appreciated that these anchor transmissions of the preamble 28 and postamble 124 may in fact be combined through a proper scaling of the clock signal 104 so that the average interval 102 equals the desired inter-sampling duration 85 (provided variation in that inter-sampling duration 85 may be tolerated), In this case, the preambles 28 and postambles 124 may be linked to each other by proximity rather than by data.

As noted herein, during the sleep times of the transmitter units 12 the carrier will be turned off and any receiver circuitry will be turned off; however, this should be understood to include any substantial reduction in carrier output or receiver detection capabilities below a level necessary to communicate with the receiver 16.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion, Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microcontroller" and "a controller" or "the microcontroller" and "the controller," can be understood to include one or more microcontrollers that can communicate in a stand-alone and/or a distributed environment(s), and can thus be configured to communicate via wired or wireless communications with other controllers, where such one or more controller can be configured to operate on one or more controller-controlled devices that can be similar or different devices. Furthermore, references to memory, unless otherwise specified, can include one or more controller-readable and accessible memory elements and/or components that can be internal to the controller-controlled device, external to the controller-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as conic within the scope of the following claims. All of the publications described herein, including patents and non-patent publications, are hereby incorporated herein by reference in their entireties.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What we claim is:

1. A wireless data transmitter comprising:
a radio transmitter providing modulation of a radiofrequency carrier according to a data pattern in a wake state, and cutting transmission of the radiofrequency carrier in a sleep state, the sleep state providing less power consumption than the wake state;
a controller communicating with the radio transmitter-and executing a program stored in non-transitory medium to:
(a) receive data to be communicated;
(b) switch the radio transmitter into the wake state for transmission of a multi-bit preamble through the modulation of the carrier;
(c) after transmission of the preamble, switch the radio transmitter into the sleep state for a data duration according to a function mapping the data duration to a unique value of the data to be communicated;
(d) switch the radio transmitter into the wake state for transmission of a multi-bit postamble through modulation of the carrier to signal an end of the data duration, wherein the transmitted preamble and postamble communicate data uniquely identifying the preamble and postamble to each other and to the data to be communicated at step (c).

2. The wireless data transmitter of claim 1 wherein the controller performs steps (a)-(d) with different data to be communicated and different transmissions.

3. The wireless data transmitter of claim 1 wherein the controller operates in a wake state during steps (b) and (d) and switches itself to a sleep state during step (c).

4. The wireless data transmitter of claim 3 wherein a power consumption during step (c) by the wireless data transmitter is more than 1000 times less than the power consumption during steps (b) and (d).

5. The wireless data transmitter of claim 1 wherein the preamble and postamble remain constant in each repetition of step (d).

6. The wireless data transmitter of claim 1 wherein at least one of the preamble and one of the postamble are adapted to provide an encoded address uniquely identifying the wireless data transmitter with respect to other wireless data transmitters.

7. The wireless data transmitter of claim 1 further including an analog-to-digital converter and further including the step of:
reading a sensor attached to the analog-to-digital converter to provide the data to be communicated; and
wherein a time between the repetitions of step (d) is greater than 100 times a mode average of the data duration.

8. The wireless data transmitter of claim 1 wherein the data has a predetermined frequency distribution describing how common given values of the data are and wherein the most frequent data values are mapped to the smallest data durations by, the function.

9. The wireless data transmitter of claim 1 wherein the controller further delays after step (d) and before step (b) by a pseudorandom or random interval.

10. The wireless data transmitter of claim 1 wherein the data to be communicated includes error correction data and payload data, the error correction data operating to allow error detection or correction in the payload data.

11. The wireless data transmitter of claim 1 wherein the function has a domain equal to a bit length of the data to be communicated and a range equal to two raised to the power of the bit length and provides a one-to-one mapping between domain and range.

12. The wireless data transmitter of claim 1 wherein the preamble and postamble are narrowband signals wherein a frequency of the carrier is at least 5000 times a bandwidth of the preamble and postamble.

13. The wireless data transmitter of claim 1 further comprising:
a radio receiver providing demodulation of the radiofrequency carrier of the radio transmitter as received wirelessly; and
a receiver controller executing a program stored in not-transitory medium and communicating with the radio receiver to:
(a) receive data to be communicated;
(b) detect transmission of the preamble by the radio transmitter;
(c) start a timer based on detection of the preamble;
(d) detect transmission of the postamble by the radio transmitter to stop of the timer and provide the data duration;

(e) decode a transmitter address from at least one of the preamble and postamble and (f) use the function on the data duration to decode the data to be communicated and associated with the decoded address.

14. The wireless data transmitter of claim 13 wherein the radio receiver further provides a signal strength measurement of the radiofrequency carrier and wherein the receiver controller further executes the program to detect a transmission error if the signal strength measurement fails to drop by a predetermined amount after detection of the preamble or postamble.

15. The wireless data transmitter of claim 13 wherein the controller rejects decoded data if a postamble associated with the decoded data is not followed by a matching preamble.

16. The wireless data transmitter of claim 13 wherein the receiver controller further executes the program to operate on the decoded data to isolate a payload and error correction code to provide error correction to the payload of the decoded data.

17. The wireless data transmitter of claim 1 wherein the data to be communicated is multi-bit data and wherein the function mapping the data duration to a unique value of the data to be communicated provides different data durations for multi-bit data having identical lengths but different values.

18. A wireless data transmitter comprising:

a radio transmitter providing modulation of a radiofrequency carrier according to a data pattern in a wake state, and cutting transmission of the radiofrequency carrier in a sleep state, the sleep state providing less power consumption than the wake state;

a controller communicating with the radio transmitter, the controller executing a program stored in non-transitory medium to:

(a) receive data to be communicated;

(b) switch the radio transmitter into the wake state for transmission of a multi-bit preamble through the modulation of the carrier;

(c) after transmission of the preamble, switch the radio transmitter into the sleep state for a data duration according to a function mapping the data duration to a unique value of the data to be communicated;

(d) switch the radio transmitter into the wake state tier transmission of a multi-bit postamble through modulation of the carrier to signal an end of the data duration and wherein the controller further periodically uses predetermined calibration data as the data to be communicated, the calibration data providing an indication of the speed of a clock of the controller controlling the data duration in step (c).

19. A wireless data transmitter comprising:

a radio transmitter providing modulation of a radiofrequency carrier according to a data pattern in a wake state, and cutting transmission of the radiofrequency carrier in a sleep state, the sleep state providing less power consumption than the wake state;

a controller communicating with the radio transmitter, the controller executing a program stored in non-transitory medium to:

(a) receive data to be communicated;

(b) switch the radio transmitter into the wake state for transmission of a multi-bit preamble through the modulation of the carrier;

(c) after transmission of the preamble, switch the radio transmitter into the sleep state for a data duration according to a function mapping the data duration to a unique value of the data to be communicated;

(d) switch the radio transmitter into the wake state for transmission of a multi-bit postamble through modulation of the carrier to signal an end of the data duration wherein a modulation rate of the preamble and postamble is different from a clock rate of a timer measuring the data duration.

* * * * *